United States Patent [19]

Seymour et al.

[11] 4,305,244

[45] Dec. 15, 1981

[54] FEEDER HOUSE DESIGN FOR A COMBINE

[75] Inventors: Shaun A. Seymour; Carl E. Bohman, both of New Holland, Pa.

[73] Assignee: Sperry Corporation, New Holland, Pa.

[21] Appl. No.: 134,722

[22] Filed: Mar. 27, 1980

[51] Int. Cl.³ .................... A01F 12/10; A01D 41/12; A01D 75/18
[52] U.S. Cl. ............................. 56/10.2; 56/DIG. 15; 56/16.5; 209/1; 209/590; 209/698; 209/935
[58] Field of Search ............... 56/10.2, DIG. 15; 130/27 JT, 27 S, 27 R; 198/719; 209/1, 247, 261, 263, 590, 592, 593, 698, 935

[56] References Cited

U.S. PATENT DOCUMENTS

| | | | |
|---|---|---|---|
| 2,657,799 | 11/1953 | Johnson et al. | 209/698 |
| 3,664,348 | 5/1972 | Maiste et al. | 130/27 JT |
| 3,805,798 | 4/1974 | Girodat | 56/10.2 |
| 3,971,390 | 7/1976 | McDuffie et al. | 56/10.2 |

Primary Examiner—Jay N. Eskovitz
Attorney, Agent, or Firm—Larry W. Miller; Frank A. Seemar

[57] ABSTRACT

In an infeed housing for a harvesting and threshing machine there is provided an improved infeed housing design that redirects the flow of crop material along its predetermined path of travel at a selectively creatable discontinuity in the floor of the infeed housing to ensure the ejection of stones and other non-frangible objects subsequent to their detection and prior to their reaching the threshing and separating apparatus of the combine.

8 Claims, 2 Drawing Figures

FEEDER HOUSE DESIGN FOR A COMBINE

BACKGROUND OF INVENTION

This invention relates generally to crop harvesting and threshing machines, more commonly known as combines, and more particularly to the infeed housing attached to the front of the base unit of the combine which is used to transfer the crop material from the harvesting attachment or header upwards into the base unit where the threshing operation occurs. Specifically, the invention is concerned with the shape of the floor of the infeed housing and the cooperative effect of this shape with the location of a stone ejecting trap door that is effective to eject stones and other non-frangible objects from the crop material as they are passed along with the crop material from the header upwardly through the feeder house towards the base unit.

In the prior conventional types of combines, stone traps were routinely provided to separate out large hard objects or stones that generally were greater than three or four inches in size. The stone traps provided in the conventional combines were utilized generally in two types of stone ejecting systems. The passive type of stone ejecting system employed a stone trap with a space or gap between the top of the crop elevator or conveyor within the infeed housing and the base unit threshing apparatus. In this type of an ejecting system hard objects or stones were conveyed upwardly along with the crop material from the header through the infeed housing towards the threshing apparatus. When the crop material passed over the gap, stones by their very weight would fall down through the gap into the stone trap. Those stones that were carried along with the crop material past the stone trap were passed into contact with the threshing cylinder, which generally was rotatably mounted transversely to the longitudinal axis of the combine. If the hard objects or stones were of sufficient size so that they would not easily pass between the threshing cylinder and the threshing concaves, they would be thrown backwardly by the rotation of the cylinder into the gap or space. Thus, this particular cooperation between the threshing cylinder and the stone trap created an almost natural stone ejecting system for conventional combines. Even if a stone did pass into the threshing cylinder it made only one pass about the cylinder and across the underlying concave, usually doing minimal damage to the threshing apparatus before it was passed on through and ejected from the combine.

The second type of stone ejecting system generally employed an active system which utilized some sort of an electronic sensor, such as an acoustic transducer typically in the form of a piezoelectric disc mounted in a sensing plate, in conjunction with a stone trap. The electronic sensor responded to the characteristics of the sound, such as the amplitude and frequency, that an impacting stone generated in the sensing plate. This signal would then be transferred through an electronic circuit that filtered out the range within which the amplitude and frequency was characteristic of stones. Within this characteristic spectral range the electronic circuit automatically activated a latch releasing mechanism on a door along the bottom of the infeed housing that would pivot open to permit the stones or hard objects to be ejected from the feeder house, along with a small amount of crop material.

This latter or active type of sensing system utilizing a latched trap door that was automatically opened upon impact of a rock or hard object against the sensing plate was an appreciable step forward in stone detecting and ejecting technology. However, because the stones or hard objects were generally passed along the predetermined path with the crop material, quite frequently when the stone trap door was opened the stones or hard objects continued to move along with the crop material and passed over the opening created by the lowered trap door. Frequently, the detected stones would still pass upwardly from the infeed housing into the threshing apparatus, where it would pass with the crop material about the threshing concave and the threshing cylinder. Again, because it was only a single pass of crop material about a portion of the conventional transverse threshing cylinder and across a relatively narrow strip of concave, detected but unejected stones still caused minimal damage to the combine.

An alternate type of active stone ejecting system utilized a pinch roll rotatably mounted in the infeed housing at a predetermined distance above the trap door. When a stone of sufficient size was carried by the crop elevator between the pinch roll and the trap door into compressive engagement therewith, the rotation of the pinch roll exerted a downward force through the stone against the trap door. The trap door was spring loaded closed so that above a predetermined pressure the door would be forced open, thereby causing the stone to be directed downwardly and out of the infeed housing through the opening created by the opened trap door. An obvious drawback to this system was the fact that large, but relatively flat stones or hard objects capable of passing between the pinch roll and the trap door were ingested into the combine where they could still damage the operating components.

The advent of rotary or axial flow type of combines with single or multiple threshing and separating rotors utilized in an orientation where the longitudinal axis of each rotor is either parallel or transverse to the longitudinal axis of the combine presented a greater need for more effective stone eliminating or ejecting systems. This increased need stems from two principal facts. Axial flow combines generally do not have a transverse threshing cylinder at the top of the infeed housing to throw or direct stones or other damage inducing objects back into the stone trap. They also pass the crop material about the periphery of each rotor as many as five or six times during threshing and separation as the crop material progresses axially along the length of each rotor.

An improved electronic stone or hard object detecting system was developed, as shown and described in copending U.S. patent application Ser. No. 109,932, filed Jan. 4, 1980 and assigned to the assignee of the present invention, utilizing a sensing plate that is positioned transversely across the bottom of the infeed housing astride the path of crop flow from the header to the base unit of the combine. In this type of a system the reaction time for the opening of the trap door is relatively short and, because the crop material in an axial flow combine makes multiple passes about the rotor as it is transferred along the length of the concave during the threshing and separating cycle, elimination of detected stones and hard objects becomes more critical. A stone or other non-frangible object passing through an axial flow type of combine is more apt to damage the entire length of the concaves, which with their rasp or rub bars cooperate with the rotors to thresh the crop material. In marked contrast, a stone passing through a conventional type of combine with a transversely oriented threshing cylinder and underlying concave contacts only a very small portion of the concave and is therefore likely to cause relatively little damage in its single pass about a portion of the cylinder. Thus, in an improved detecting system such as that shown and described in the aforementioned copending patent application, use on an axial flow type of combine necessitates a much higher percentage of stone ejection. Any improved ejecting system operating within this new detection system must be fast acting since the crop material has been determined to move at an approximate rate of fifteen feet per second through a typical infeed housing and the typical reaction time from time of detection of a stone or hard object to ejection is 0.2 of a second.

The foregoing problems, are solved in the design of the infeed housing comprising the present invention by providing an improved infeed housing design that redirects the flow of crop material along its predetermined path of travel at a selectively creatable discontinuity in the floor of the infeed housing to ensure the ejection of stones and other non-frangible objects subsequent to their detection and prior to their reaching the threshing and separating apparatus in a combine.

BRIEF DESCRIPTION OF THE DRAWINGS

The features and advantages of this invention will become apparent upon consideration of the following detailed disclosure of the invention, especially when it is taken in conjunction with the accompanying drawings wherein.

SUMMARY OF THE INVENTION

It is a principal object of the present invention to provide in an infeed housing for a combine an improved design that enhances the ejection capability of the stone ejecting system when stones or other hard objects are included in the crop material that is transferred upwardly from the header through the infeed housing towards the base unit threshing apparatus.

It is another object of the present invention to provide an improved infeed housing stone ejection design that is compatible with an electronic stone detection system which will reliably eject stones and other non-frangible objects subsequent to their detection.

It is a feature of the present invention that there is provided in the design of the improved infeed housing a discontinuity in the floor or bottom surface of the infeed housing at the point where the direction of the path of the crop material changes as it flows from the header through the infeed housing to the threshing and separating apparatus for the base unit.

It is another feature of the present invention that the discontinuity in the floor of the improved feeder house design utilizes a trap door at the point of the change of direction in the flow path so that the existing flow or transport velocity of the crop material as it moves upwardly through the feeder housing along its initial vectorial direction of travel is utilized to carry stones and other hard objects out the trap door prior to their reaching the threshing apparatus.

It is an advantage of the present invention that an extremely high percentage of stone or hard object ejection with a high reliability factor is achieved.

It is another object of this invention that it can easily be used with an active type of stone and other non-frangible object detecting system employing an electronic sensing device to eject the non-frangible objects from the combine prior to the crop material and objects reaching the threshing and separating apparatus.

It is another advantage of the present invention that there is no need for deflectors to be provided to change the initial direction of movement of the stones or other non-frangible objects in the crop material as they are conveyed at their transport velocity to a subsequent downward direction with a particular ejection velocity to accomplish their ejection from the infeed housing.

These and other objects, features and advantages are obtained by providing in a crop harvesting and threshing machine an improved infeed housing design that redirects the flow of crop material along its predetermined path of travel at a selectively creatable discontinuity in the floor of the infeed housing to ensure the ejection of stones and other non-frangible objects subsequent to their detection and prior to their reaching the threshing and separating apparatus in a combine.

DETAILED DESCRIPTION OF THE PREFERRED EMBODIMENT

Figure 1:
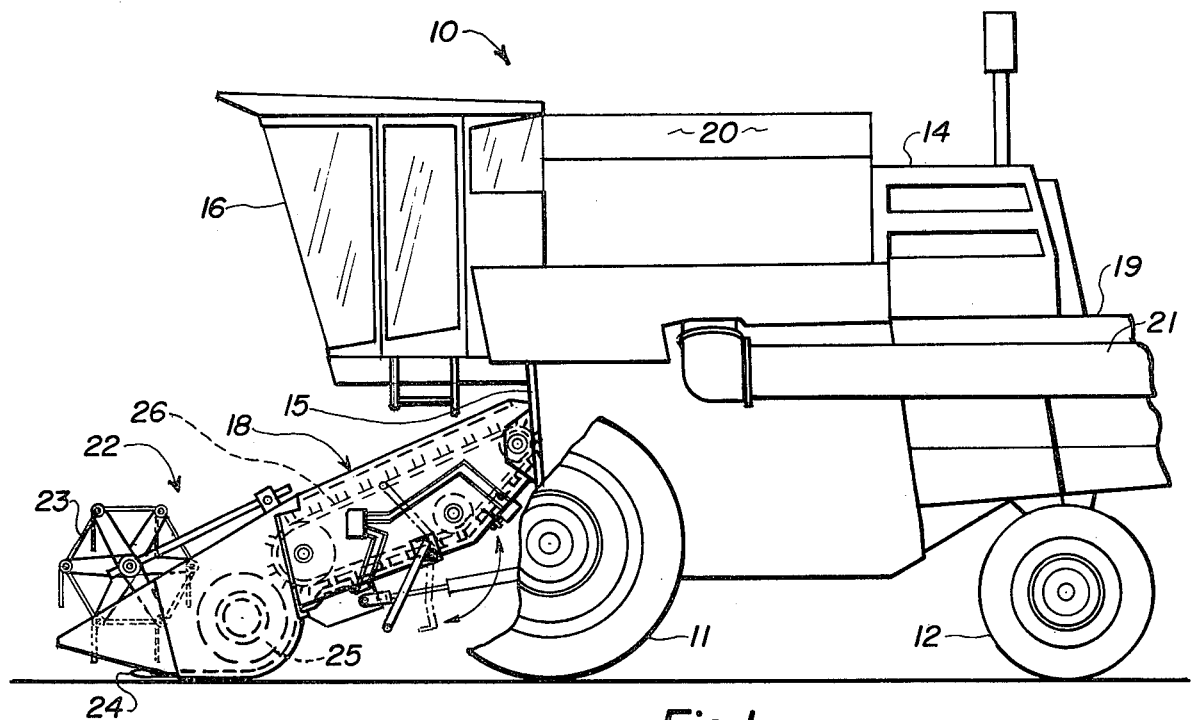
FIG. 1 is a side elevational view of a combine with the infeed housing of the present invention mounted thereto and a reel type crop header fastened to the infeed housing.

Referring to FIG. 1, there is shown a combine in side elevational view with the critical portions of this invention illustrated in fragmentary manner by having their outline shown in relative detail. As can be seen, the combine 10 has a mobile frame supported by a pair of primary driving wheels 11 in the front and a smaller pair of steerable wheels 12 in the rear. The combine 10 is powdered by an engine (not shown) beneath the engine housing 14 which is usually diesel and of relatively high horsepower. The engine is mounted on the upper portion of the combine in suitable fashion and, by means of belts or sprocket driven chains, is connectable to the operational components of the combine.

The combine 10 has a main frame or housing 15 that internally supports the threshing and separating apparatus, as well as the cleaning means, both of which are not shown. The combine 10 with its main frame 15 also supports the grain pan, also not shown. The operators cab 16 extends forwardly out over the front of the main frame 15 atop the infeed housing and is indicated generally by the numeral 16. The rear housing 19 encloses the discharge beater and grate assembly (not shown). The grain tank 20 is mounted essentially atop the combine 10. An unloading auger 21 is operably connected to the grain tank 20 and extends along the side of the combine in its inboard transport position. The unloading auger 21 is swingably mounted to the combine 10 so that it can be swung to the outboard position to selectively discharge into a suitable receiving vehicle the threshed and cleaned grain that is delivered to and stored in the grain tank 20. The grain is delivered to the grain tank from the cleaning means by a crop elevator (not shown).

The infeed housing 18 has detachably mounted to its front a header attachment, indicated generally by the numeral 22. The header attachment may either be of the type is a row crop corn harvesting attachment, a window pickup attachment, a grain-bat reel type or a soybean reel type of attachment of the type shown in FIG. 1. The header 22 in this instance comprises a tined reel 23 that is adjustably and rotatably mounted to the header 22 across substantially its entire transverse width. Beneath the reel 23 is a direct-cut sickle bar 24 which serves to cut the crop material as the combine 10 moves across the field. The reel 23 carries the crop material back to the consolidating auger 25, which consolidates the cut crop material and transfers it rearwardly and upwardly through a suitable opening into the front of the infeed housing 18. The infeed housing 18 has rotatably mounted within a plurality of chains interconnected by slats which are rotatably driven to convey the crop material upwardly to the threshing and separating mechanism (not shown) of the combine 10. This slat and chain apparatus is generally known as crop elevator 26.

The structure thus far has been described generally since it is old and well known in the art. The structure and interrelationships between the various operating components of the combine are described in greater detail in U.S. Pat. Nos. 3,626,472, issued Dec. 7, 1971, and 3,669,122, issued June 13, 1972, both to Rowland-Hill. It should be noted at this time that although the invention hereinafter will be described generally in the context of an axial flow type of combine, it is equally applicable to conventional types of combines utilizing at least one transverse threshing cylinder. Additionally, this invention is equally applicable to axial flow type of combines utilizing either a single threshing and separating rotor or multiple threshing and separating rotors, oriented either parallelly or transversely to the longitudinal axis of the combine.

Figure 2:
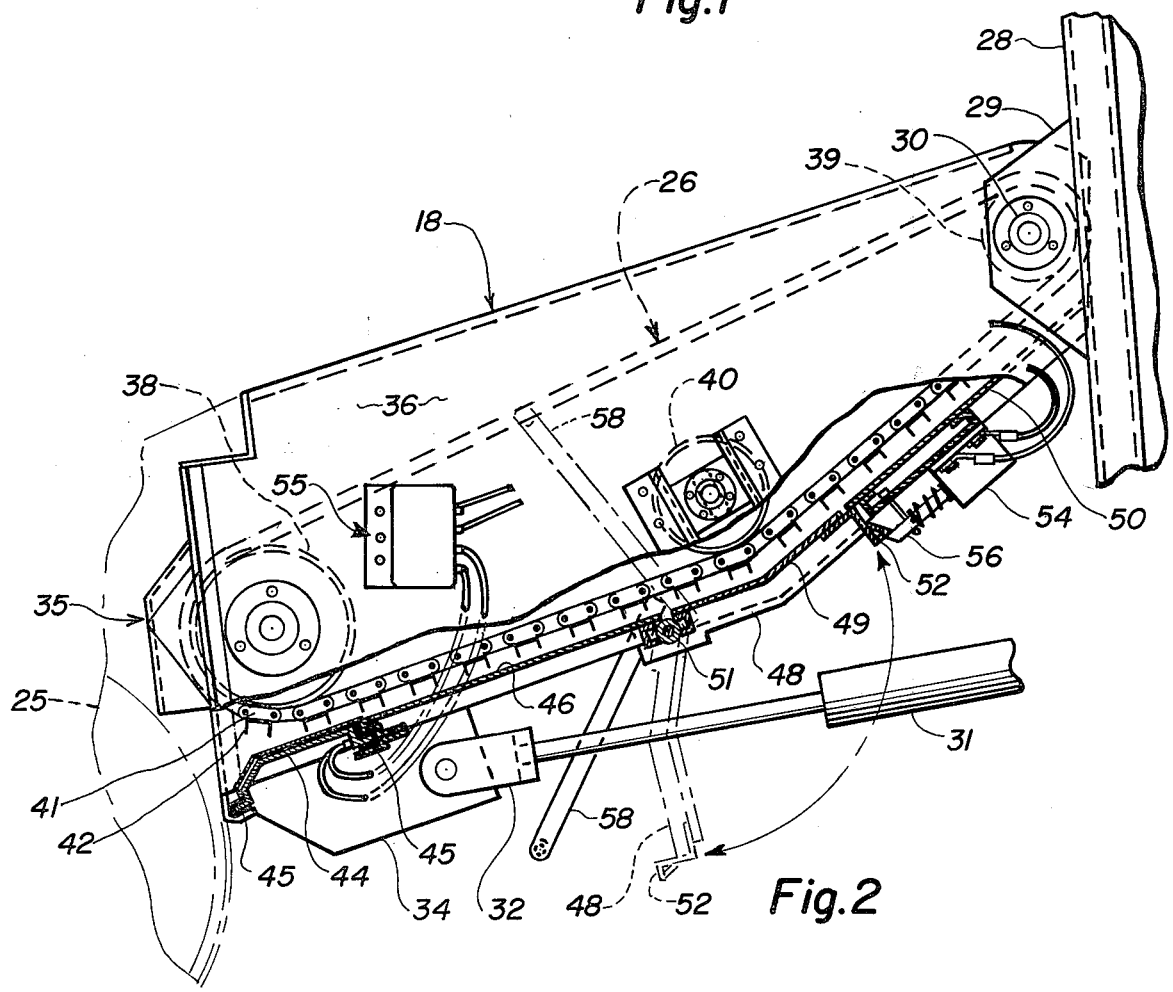
FIG. 2 is an enlarged side elevational view of the infeed housing showing the sensing plate in relation to the stone ejecting trap door in the floor of the infeed housing.

Looking in more detail at the infeed housing 18 in FIG. 2 it is seen that the infeed housing is movably affixed to the main frame 15 of the combine via a vertical support beam 28 and a support plate 29 on each side of the combine. The housing 18 is hinged for pivotable movement about mounting 30. The infeed housing 18 is raised and lowered by means of a pair of hydraulic cylinders 31, only one of which is shown, which are fastened to the base unit of the combine 10 on one end and appropriately fastened for up and down movement by coupling 32 to mounting plate 34. The infeed housing 18 has a forward portion 35 that has an opening between the side sheets 36, only one of which is shown, and to which is suitably attached the appropriate header.

The crop elevator 26 is entrained about a driven front guide roller 38 and a driving rear roller 39. The driving rear roller 39 has its shaft serve as an integral part of the mounting 30 and is the axis about which the infeed housing 18 is rotated when the header and infeed housing 18 are raised or lowered. A pinch roll 40 is mounted transversely across the infeed housing 18 intermediately of the driven front guide roll 38 and the rear driving guide roll 39. The crop elevator 26 is normally comprised of three spaced apart chains 41, only one of which is shown, interconnected by a plurality of U-shaped slats 42. The two outside chains 41 pass generally about sprockets on the opposing ends of the shafts which pass through the driven front guide roll 38 and the rear driving guide roll 39. The crop elevator 26 is driven generally in a counterclockwise direction and carries the crop material from the header upwardly and rearwardly along its predetermined path toward the threshing and separating apparatus, not shown, in the base unit of the combine 10.

The floor of the infeed housing 18 is comprised of two major portions with four distinct sections. Across the front of the infeed housing 18 there is a sensing plate or bar 44 which spans its entire width. This sensing bar 44 is mounted so as to be acoustically isolated from any vibrations or noise induced by the infeed housing 18 during the operation of the combine 10. This acoustical isolation is achieved by means of non-magnetic sound supressive material 45, such as rubber, which is placed between the front and rear edges of the sensing bar and the infeed housing mounting brackets. The sensing bar 44 is shown in greater detail in the aforementioned copending U.S. patent application Ser. No. 109,932.

The second section of the infeed housing 18 comprises a section 46 that is in the same flow plane as the upper surface of the sensing bar 44.

Next, a pivotally mounted trap door is positioned and designed so that the crop material initially follows the flow path defined by the top portion of sensing bar 44 and the second section 46 of the infeed housing 18. At a predetermined point in the length of the trap door 38, the door is angled upwardly in a generally oblique direction from the direction of travel of the crop material defined by the first portion of the infeed housing. This upwardly or obliquely inclined portion of the trap door 48, indicated by the numeral 49, defines the path which the crop material will follow as it is conveyed by the crop elevator 26 upwardly from the second section 46 of the infeed housing 18 into the threshing and separating apparatus of the combine.

The last portion of the infeed housing floor comprises a section 50 which continues in the upwardly extending direction along the same general axis as that established by the obliquely angled portion 49 of the trap door. Thus, the floor of the infeed housing 18 establishes and defines a flow path for the crop material in conjunction with the crop elevator 26 which serves to convey the crop material from the header upwardly into the threshing and separating apparatus of the combine 10.

The trap door 48 is hingedly mounted at location 51 to the underside of section 46. The opposing end of trap door 48 has a latching tab 52 affixed to its underside. Tab 52 cooperates with the latching means 54 to hold the trap door 48 in the closed position during operation. As can be seen in FIG. 2 the electronic stone detecting circuitry, indicated generally by the numeral 55, connects the sensing bar 44 with the latching means 54. The latching means 54 has a retractable plunger 56 which is retracted upon sensing the impact of the stone or other non-frangible object upon the sensing plate 44 by the stone detecting circuitry 55. When the stone detecting circuitry 55 has been activated and the trap door 48 has dropped to the open position, the door may be returned to its closed position manually by engaging the handle 58 and pivoting it and the door 48 upwardly to its closed position.

In operation the combine 10 is driven across the field of crop material which is harvested by the harvesting attachment or header 22. The header consolidates the crop material via the consolidating auger 25 and transfers the crop material rearwardly and upwardly into the infeed housing 18. Infeed housing 18 has its crop elevator 26 rotatably moving in a generally counterclockwise direction to engage the crop material with the slats 42 and chains 41 to move the crop material generally rearwardly and upwardly towards the threshing and separating apparatus of the combine 10. As the crop material enters the infeed housing 18 via the front opening it passes over the sensing bar 44. Any rocks or non-frangible objects must necessarily strike the sensing bar 44.

Upon impact the spectral characteristics of the impacting object is analyzed by the stone detecting circuitry 55 by having the amplitude and frequency of the sensing bar 44 transmitted thereto. When the object generates a response within the known spectral characteristics of stones and other non-frangible objects the circuitry 55 sends a signal to the latching means 54. This signal causes the plunger 56 to retract out of retaining interference with locking tab 52. This releases the trap door 48 from its raised position and permits the door to swing open either by force of gravity on its own or by some spring assisted or otherwise mechanically assisted drive.

As the crop material with the stone or other non-frangible object therein is moved rearwardly by the crop elevator 26 it continues to travel at the existing transport velocity along the initial vectorial direction of travel. When the crop material with the non-frangible object therein reaches the opening created by the opening of the trap door 48, it continues to move along the initial vectorial direction of travel. The oblique angularization of the infeed housing 18 and the discontinuity in the floor of the infeed housing caused by the opening of the trap door 48 at this particular point causes all the crop material to essentially miss contact with the oliquely angled section 50 of the infeed housing. Since the crop material continues to move in a direction along the predetermined path of the first portion of the infeed housing 18 it is carried rearwardly out of the opening or discontinuity provided in the floor of the infeed housing 18. Thus, the undesired non-frangible object or stone is ejected safely from the combine 10 without being ingested into the threshing and separating apparatus, thereby avoiding considerable damage to the threshing and separating apparatus of the combine. The crop material and non-frangible objects are assisted in retaining their original direction of travel along the first portion of the predetermined path of travel by the action of the pinch roll 40 which insures that the chains 41 and their interconnecting slats 42 at the point of discontinuity in the floor engage and retain the crop material in its flow along the first portion of the predetermined path. When the operator is satisfied that the stone or other non-frangible object has been safely removed from the combine, he may manually engage the closing handle 58 and raise the trap door from its generally downward position to its fully raised position.

Alternately, the pinch roll 40 could be operably connected to the trap door 48 so that upon actuation of the latch means 54 by the stone detecting circuitry 55 the pinch roll also is lowered simultaneously with the opening of the trap door 48 to block the path of flow of the crop material upwardly and ensure that all of the crop material and the accompanying stones or non-frangible objects are directed out of the discontinuity in the floor of the infeed housing 18 by the opening of the trap door 48.

While the preferred structure and the principles of the present invention have been incorporated as shown and described above, it is to be understood that the invention is not to be limited to the particular details thus presented, but, in fact, widely different means may be employed in the practice of the broader aspects of this invention. The scope of the appended claims is intended to encompass all obvious changes in details, material and arrangement of parts which will occur to one of skill in the art upon reading of the disclosure.

It should also be noted that although the improved design of the instant infeed housing is described in the context of use with an electronic stone or other non-frangible object detecting system, it is equally well adaptable for use with any type of a suitable active ejecting system.

Having thus described the invention, what is claimed is:

1. In an infeed housing adapted to be attached to a harvesting and threshing machine on a first end and a harvesting attachment on a second end so that crop material taken from a field by the harvesting attachment flows along a predetermined path of travel from the second end to the first end, the combination comprising:
   (a) a generally elongate flat floor having a first portion and a second portion extending transversely between the first end and the second end, the floor being in material flow communication with the harvesting attachment and the machine such that a predetermined path of travel moves in a first direction across the first portion and in a second direction oblique to the first direction across the second portion;
   (b) first and second opposing side walls attached to the floor extending from the first end to the second end;
   (c) a top covering member attached to the first and second opposing side walls forming with the floor an enclosed flow channel for the crop material;
   (d) conveying means moveably mounted within the infeed housing between the first and second ends adapted to convey the crop material from the second end to the first end, said conveying means having a first part substantially parallel to the first portion of said floor and cooperable therewith to move the crop material across said first portion in said first direction and a second part substantially parallel to the second portion of said floor and cooperable therewith to move the crop material across said second portion in said second direction; and
   (e) object ejecting means operably fastened to the infeed housing between the first and second portions of the floor selectively actuatable upon entry of a non-frangible object with the crop material into the infeed housing to create a discontinuity in the floor between the first and second portions such that upon actuation said first part of said conveying means moves the crop material in the first direction along the first portion of the floor and upon reaching the discontinuity the first part of said conveying means trajects the crop material through the discontinuity along said first direction to carry the crop material and the non-frangible object out of the infeed housing prior to the object's being conveyed into the machine across the second portion.

2. The infeed housing according to claim 1 wherein the object ejecting means further comprises a swingably mounted trap door extending between the first and second opposing side walls pivotable about an axis transverse to the direction of crop material flow along the predetermined path of travel so that the trap door is moveable between a closed position wherein the crop material is conveyed across it by the conveying means successively in the first direction and then the second direction and an opened position upon actuation wherein the discontinuity is created in the floor to permit a non-frangible object to be conveyed out of the infeed housing.

3. The infeed housing according to claim 2 wherein the trap door is retained in the closed position by a latching means.

4. The infeed housing according to claim 3 wherein the trap door is pivotally fastened to the first portion of the floor and the latching means is fastened to the second portion.

5. The infeed housing according to claim 4 wherein the object ejecting means further comprises an electronic non-frangible object detector mounted in the infeed housing, connected to the latching means and effective upon entry of a non-frangible object to automatically actuate the latching means to release the trap door to thereby permit the door to move from the closed position to the opened position.

6. The infeed housing according to claim 5 wherein the electronic non-frangible object detector further comprises a sensing means adjacent the second end extending transversely between the first and second opposing side walls and forming an integral part of the first portion of the floor effective upon the passing of the non-frangible object thereacross to cause the latching means to be actuated.

7. The infeed housing according to claims 1 or 6 wherein the conveying means further comprises a crop elevator having a plurality of chains interconnected by a plurality of elongated slats, the crop elevator being drivingly mounted about a first guide drum adjacent the second end and a second driving drum adjacent the first end, the first and second drums being rotatably mounted in the first and second opposing side walls.

8. The infeed housing according to claim 7 wherein the object ejecting means further comprises a pinch roll rotatably mounted in the first and second opposing side walls generally overlying the discontinuity and cooperative with the crop elevator to assist in directing a non-frangible object out of the infeed housing.

* * * * *